United States Patent
Kooiman et al.

(10) Patent No.: US 10,196,127 B2
(45) Date of Patent: Feb. 5, 2019

(54) WING PIVOT STRUCTURE FOR TILTROTOR AIRCRAFT

(71) Applicant: Bell Helicopter Textron Inc., Fort Worth, TX (US)

(72) Inventors: James Everett Kooiman, Fort Worth, TX (US); Brian Dale Obert, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 328 days.

(21) Appl. No.: 15/271,699

(22) Filed: Sep. 21, 2016

(65) Prior Publication Data

US 2018/0079485 A1    Mar. 22, 2018

(51) Int. Cl.

| | |
|---|---|
| B64C 3/56 | (2006.01) |
| B64C 29/00 | (2006.01) |
| B64C 11/28 | (2006.01) |
| B64C 5/10 | (2006.01) |
| B64C 5/02 | (2006.01) |
| B64D 27/26 | (2006.01) |

(52) U.S. Cl.
CPC .................. B64C 3/56 (2013.01); B64C 5/02 (2013.01); B64C 5/10 (2013.01); B64C 11/28 (2013.01); B64C 29/0033 (2013.01); B64D 27/26 (2013.01)

(58) Field of Classification Search
CPC ......... B64C 29/033; B64C 3/56; B64C 11/28; B64C 5/10; B64C 5/02
See application file for complete search history.

(56) References Cited

U.S. PATENT DOCUMENTS

| 3,490,720 | A | * | 1/1970 | Girard | B64C 3/40 244/7 R |
|---|---|---|---|---|---|
| 4,132,374 | A | * | 1/1979 | Abell | B64C 3/40 244/46 |
| 4,691,878 | A | * | 9/1987 | Vaughan | B64C 3/56 244/49 |
| 5,337,974 | A | * | 8/1994 | Rumberger | B64C 3/40 244/39 |
| 5,836,541 | A | * | 11/1998 | Pham | B60F 5/02 244/2 |
| 5,984,228 | A | * | 11/1999 | Pham | B64C 37/00 244/100 R |

(Continued)

*Primary Examiner* — Timothy D Collins
*Assistant Examiner* — Tye William Abell
(74) *Attorney, Agent, or Firm* — Lawrence Youst PLLC (57) ABSTRACT

A wing pivot apparatus for rotating a wing between a flight orientation and a stowed orientation relative to a fuselage of a tiltrotor aircraft. The apparatus includes a stow ring that is rotatably mounted to the fuselage. Forward and aft wing attach assemblies are coupled respectively to forward and aft spars of the wing and are coupled to the stow ring. Forward and aft connecting assemblies are coupled respectively between the forward and aft wing attach assemblies and the stow ring and are selectively securable respectively to first and second fore-aft beams of the fuselage. A plurality of lock assemblies selectively secures the connecting assemblies to the fore-aft beams of the fuselage when the wing is in the flight orientation. An actuator coupled to the fuselage is operable to reversibly rotate the wing between the flight orientation and the stowed orientation.

20 Claims, 7 Drawing Sheets

(56) References Cited

U.S. PATENT DOCUMENTS

| | | | | |
|---|---|---|---|---|
| 6,129,306 A * | 10/2000 | Pham | ................ | B60F 5/02 |
| | | | | 244/2 |
| 8,292,216 B1 * | 10/2012 | Rumberger, Jr. | ......... | B64C 3/56 |
| | | | | 244/39 |
| 8,371,520 B2 * | 2/2013 | Easter | ................ | B60F 5/02 |
| | | | | 244/2 |

* cited by examiner

WING PIVOT STRUCTURE FOR TILTROTOR AIRCRAFT

TECHNICAL FIELD OF THE DISCLOSURE

The present disclosure relates, in general, to tiltrotor aircraft having a VTOL flight mode, a forward flight mode and a storage mode and, in particular, to a wing pivot structure for stowing the wing of a tiltrotor aircraft to reduced the footprint of the tiltrotor aircraft in the storage mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation in a VTOL flight mode and a generally vertical plane of rotation in a forward flight mode, wherein the fixed wing provides lift and the proprotors provide forward thrust. In this manner, tiltrotor aircraft combine the vertical lift capability of a helicopter with the speed and range of fixed-wing aircraft. It has been found, however, that tiltrotor aircraft may occupy a large footprint when not in use, such as during storage on an aircraft carrier flight deck. Accordingly, a need has arisen for improved storage modes for tiltrotor aircraft.

SUMMARY

In a first aspect, the present disclosure is directed to a wing pivot apparatus for rotating a wing between a flight orientation and a stowed orientation relative to a fuselage of a tiltrotor aircraft. The apparatus includes a stow ring rotatably mounted to the fuselage. First and second forward wing attach assemblies are coupled between a forward spar of the wing and the stow ring. First and second aft wing attach assemblies are coupled between an aft spar of the wing and the stow ring. First and second forward connecting assemblies are coupled respectively between the first and second forward wing attach assemblies and the stow ring and are selectively securable respectively to the first and second fore-aft beams of the fuselage. First and second aft connecting assemblies are coupled respectively between the first and second aft wing attach assemblies and the stow ring and are selectively securable respectively to the first and second fore-aft beams of the fuselage. A plurality of lock assemblies selectively secures the connecting assemblies to the fore-aft beams of the fuselage when the wing is in the flight orientation. An actuator coupled to the fuselage is operable to reversibly rotate the wing between the flight orientation and the stowed orientation.

In some embodiments, a plurality of guide clevises may be securably coupled to the fore-aft beams of the fuselage and operable to slidably receive the stow ring therein. In such embodiments, the plurality of lock assemblies may selectively secure the stow ring to the guide clevises when the wing is in the flight orientation. In certain embodiments, each of the connecting assemblies may extend between a respective wing attach assembly and a respective fore-aft beam of the fuselage at an angle between about 30 degrees and about 60 degrees relative to the respective fore-aft beam of the fuselage and preferably at an angle between about 40 degrees and about 50 degrees relative to the respective fore-aft beam of the fuselage.

In some embodiments, a plurality of clevises may be securably coupled to the fore-aft beams of the fuselage and the connecting assemblies may each include an adaptor fitting operable to sweep through the clevises such that the lock assemblies are operable to selectively secure the adaptor fittings to the fore-aft beams of the fuselage when the wing is in the flight orientation and such that the actuator is operable to reversibly rotate the wing between the flight orientation and the stowed orientation when the lock assemblies are disengaged. In certain embodiments, each of the connecting assemblies may have two points of connection with the stow ring. In some embodiments, each of the connecting assemblies may include an adaptor fitting selectively securable to a respective fore-aft beam of the fuselage, a fore-aft link extending between the adaptor fitting and a respective wing attach assembly, and an A-frame brace extending between the adaptor fitting and the stow ring. In some embodiments, the lock assemblies may be actuated pins. In certain embodiments, the actuator may be a rotary actuator such as a capstan actuator or a gear driven actuator. In other embodiments, the actuator may be a linear actuator.

In a second aspect, the present disclosure is directed to a tiltrotor aircraft having a VTOL flight mode, a forward flight mode and a storage mode. The aircraft includes a fuselage and a wing rotatably mounted to the fuselage. The wing is reversibly rotatable between a flight orientation, generally perpendicular to the fuselage, in the flight modes, and a stowed orientation, generally parallel to the fuselage, in the storage mode. A wing pivot apparatus is disposed between the fuselage and the wing. The wing pivot apparatus includes a stow ring rotatably mounted to the fuselage. First and second forward wing attach assemblies are coupled between a forward spar of the wing and the stow ring. First and second aft wing attach assemblies are coupled between an aft spar of the wing and the stow ring. First and second forward connecting assemblies are coupled respectively between the first and second forward wing attach assemblies and the stow ring and are selectively securable respectively to the first and second fore-aft beams of the fuselage. First and second aft connecting assemblies are coupled respectively between the first and second aft wing attach assemblies and the stow ring and are selectively securable respectively to the first and second fore-aft beams of the fuselage. A plurality of lock assemblies selectively secures the connecting assemblies to the fore-aft beams of the fuselage when the wing is in the flight orientation. An actuator coupled to the fuselage is operable to reversibly rotate the wing between the flight orientation and the stowed orientation.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
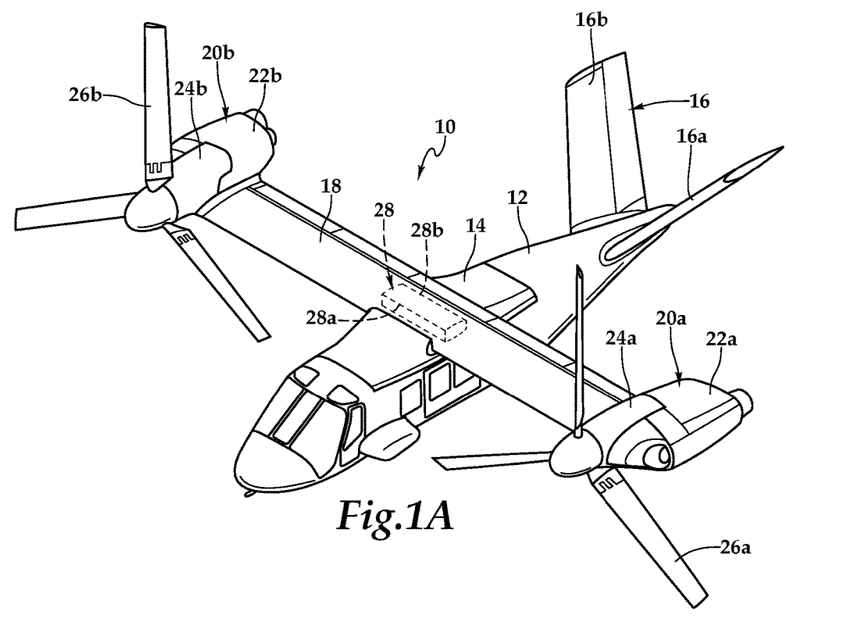
FIGS. 1A-1D are schematic illustrations of an exemplary tiltrotor aircraft in forward flight mode, in VTOL flight mode, in transition from VTOL flight mode to storage mode and in storage mode in accordance with embodiments of the present disclosure.
Figure 1B:
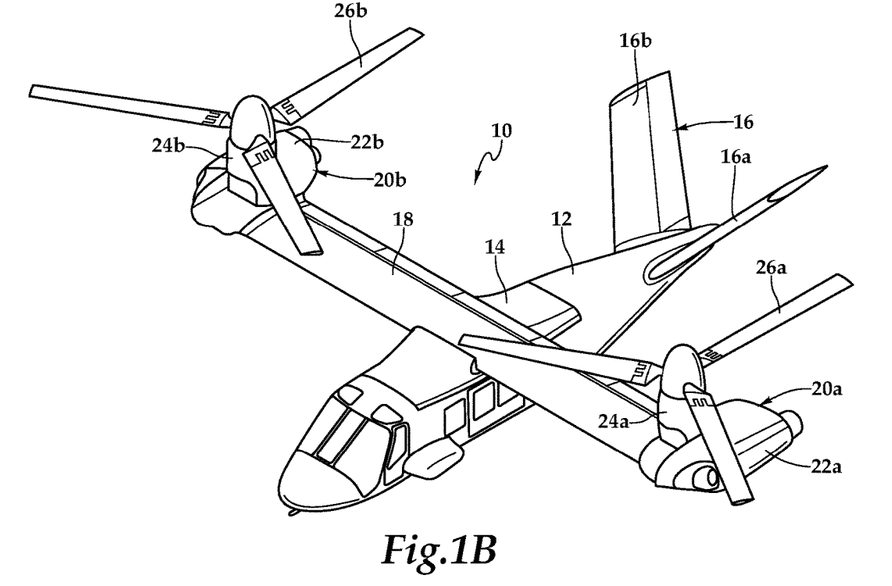
Figure 1C:
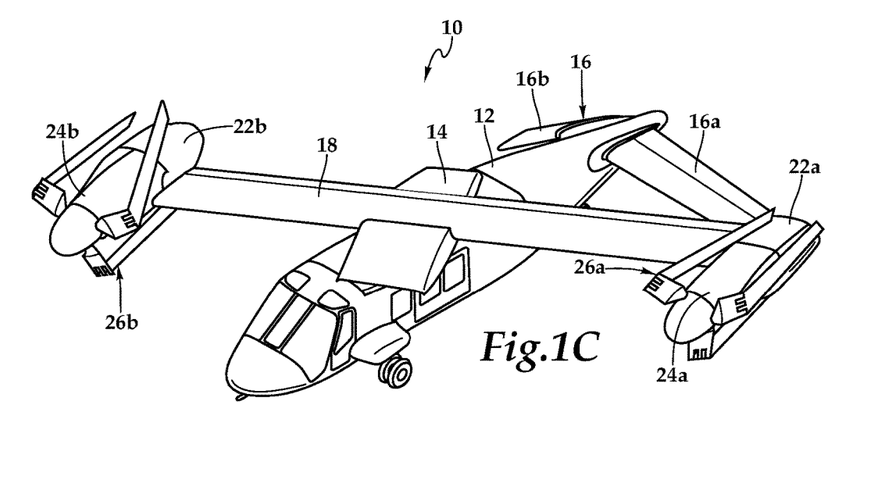
Figure 1D:
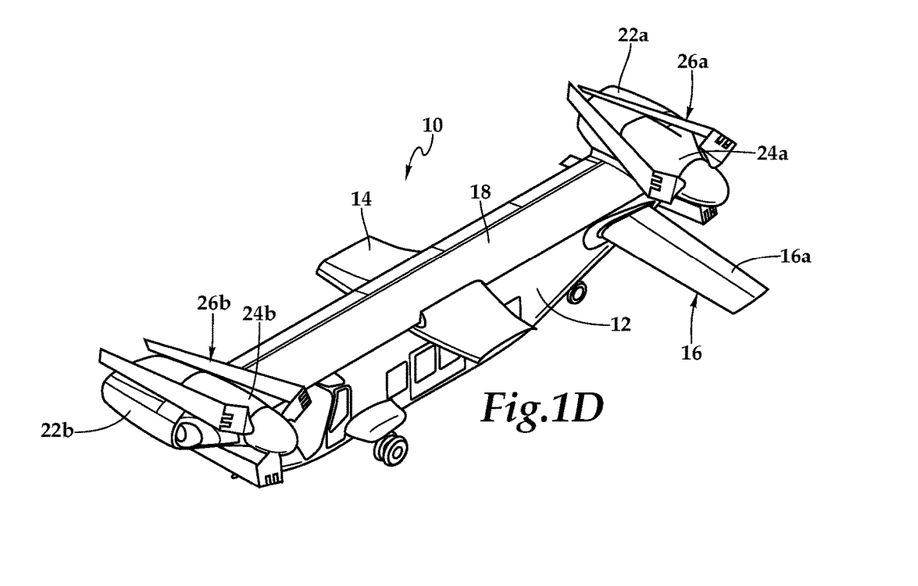

Referring to FIGS. 1A-1D in the drawings, a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 as discussed herein. Wing 18 includes a spar assembly 28, a portion of which is depicted in phantom in FIG. 1A, that extends the span of wing 18 and serves as the primary structural member of wing 18. As discussed herein, spar assembly 28 includes a forward spar and an aft spar that are coupled to a wing pivot apparatus for rotating wing 18 between flight orientation, as best seen in FIGS. 1A-1B and a stowed orientation, as best seen in FIG. 1D. Located at outboard ends of wing 18 are propulsion assemblies 20a, 20b. Propulsion assembly 20a includes a nacelle depicted as fixed pylon 22a that houses an engine and transmission. In addition, propulsion assembly 20a includes a mast assembly 24a that is rotatable relative to fixed pylon 22a between a generally horizontal orientation, as best seen in FIG. 1A, a generally vertical orientation, as best seen in FIG. 1B. Propulsion assembly 20a also includes a proprotor assembly 26a that is rotatable relative to mast assembly 24a responsive to torque and rotational energy provided via a rotor hub assembly and drive system mechanically coupled to the engine and transmission. Likewise, propulsion assembly 20b includes a nacelle depicted as fixed pylon 22b that houses an engine and transmission, a mast assembly 24b that is rotatable relative to fixed pylon 22b and a proprotor assembly 26b that is rotatable relative to mast assembly 24b responsive to torque and rotational energy provided via a rotor hub assembly and drive system mechanically coupled to the engine and transmission.

FIG. 1A illustrates aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 1B illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between forward flight mode and VTOL flight mode, which can be referred to as a conversion flight mode. Even though aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within the fuselage that provides torque and rotational energy to both proprotor assemblies 26a, 26b.

FIG. 1C illustrates tiltrotor aircraft 10 during a transition between VTOL flight mode and storage mode. To achieve such transitions, it is noted that wing 18 is reversibly rotatable between a flight orientation that is generally perpendicular to fuselage 12, as best seen in FIG. 1B, and a stowed orientation that is generally parallel to fuselage 12, as best seen in FIG. 1D. Mast assemblies 24a, 24b are reversibly rotatable between a generally vertical orientation, as best seen in FIG. 1B, and a generally horizontal orientation, as best seen in FIG. 1D. Proprotor assemblies 26a, 26b each have a radially extended orientation, as best seen in FIG. 1B, and a stowed orientation, as best seen in FIG. 1D. During conversion processes, it is important to avoid contact between the various components of aircraft 10 with each other as well as to avoid contact between the various components of aircraft 10 and the surface on which aircraft 10 rests. To achieve this result, certain of the conversion steps, or portions thereof, may need to be performed before or while other steps, or portions thereof, are being performed. These sequential and/or simultaneous operations are enabled by having individually controlled actuators operating to transition the various components of aircraft 10 independent of one another. For example, rotation of wing 18 relative to fuselage 12 is independent of rotation of mast assembly 24a relative to pylon assembly 22a. Likewise, rotation of mast assembly 24a relative to pylon assembly 22a is independent of rotation mast assembly 24b relative to pylon assembly 22b. Similarly, rotation of mast assembly 24a relative to pylon assembly 22a is independent of the folding of the rotor blades relative to the rotor hub. In addition, rotation of each rotor blade relative to the rotor hub is independent of each other. As such, those having ordinary skill in the art will understand that all such operations may be controlled individually and independent of one another. Accordingly, the order of operations and sequencing thereof may take a variety of forms, each of which is considered to be within the scope of the present disclosure.

As illustrated in FIG. 1C, wing 18 has rotated approximately 45 degrees relative to fuselage 12. Mast assemblies 24a, 24b have rotated to the horizontal orientation. Tail members 16a, 16b have fully lowered to an anhedral orientation. The rotor blades are in a stowed orientation about pylon assemblies 22a, 22b. FIG. 1D illustrates aircraft 10 in the storage mode. As illustrated, wing 18 is in stowed orientation, generally parallel to fuselage 12. Mast assemblies 24a, 24b are in the horizontal orientation. Tail members 16a, 16b are fully lowered to the anhedral orientation. The rotor blades are in a stowed orientation about pylon assemblies 22a, 22b. As illustrated, the storage mode of aircraft 10 depicted and described with reference to FIG. 1D significantly reduces the footprint of aircraft 10 as compared to the flight modes of aircraft 10 depicted and described with reference to figured 1A-1B. To return aircraft 10 from storage mode to VTOL flight mode, wing 18 is rotated approximately 90 degrees relative to fuselage 12 to the flight orientation, mast assemblies 24a, 24b are rotated to the vertical orientation, tail members 16a, 16b are rotated to the dihedral orientation and the rotor blades are operated to the radially extended orientation, as best seen in FIG. 1B.

Even though a particular scenario has been depicted and described for transitioning tiltrotor aircraft 10 between VTOL flight mode and storage mode, those having ordinary skill in the art should understand that other transition scenarios are possible and are considered to be within the scope of the present disclosure. For example, instead of the rotor blades having a stowed orientation about pylon assemblies 22a, 22b, as depicted in FIGS. 1C-1D, the rotor blades could alternatively be folded such that in the stowed orientation, the rotor blades of each proprotor are generally perpendicular to the respective mast assemblies 24a, 24b, generally parallel to one another and generally parallel to wing 18. Likewise, in some embodiments, in may not be necessary to lower tail members 16a, 16b from the dihedral to the anhedral orientation, as sufficient clearance exists for pylon assembly 22a relative to tail members 16a, 16b without tail member manipulation. Alternatively or additionally, clearance for pylon assembly 22a relative to tail members 16a, 16b may be developed by tilting wing 18 relative to fuselage 12 during rotation such that pylon assembly 22a gains certain elevation relative to tail members 16a, 16b as pylon assembly 22a approaches tail members 16a, 16b.

Referring to FIGS. 2A-2C and 3A-3B in the drawings, a wing pivot apparatus for rotating a wing of a tiltrotor aircraft between the flight orientation and the stowed orientation is depicted in various states and is generally designated 50. In the illustrated embodiment, wing pivot apparatus 50 includes a stow ring 52 that is rotatably mounted to fore-aft beams 54a, 54b of fuselage 12. In the illustrated embodiment, stow ring 52 is slidably received with a plurality of guide clevises 56a, 56b, 56c, 56d that are securably coupled to fore-aft beams 54a, 54b of fuselage 12 by bolting, welding or other suitable technique. A plurality of wing attach assemblies 58a, 58b, 58c, 58d are securably coupled to stow ring 52. In the illustrated embodiment, stow ring 52 includes lugs 60a, 60b, 60c, 60d that couple to wing attach assemblies 58a, 58b, 58c, 58d by bolting or other suitable technique. Wing attach assemblies 58a, 58b are coupled to forward spar 28a of spar assembly 28 and wing attach assemblies 58c, 58d are coupled to aft spar 28b of spar assembly 28. As discussed herein, spar assembly 28 extends the span of wing 18 and serves as the primary structural member of wing 18. Portions of wing attach assemblies 58a, 58b, 58c, 58d are securably coupled directly or indirectly to spar assembly 28 including, for example, being integral with spar assembly 28.

A plurality of connecting assemblies 62a, 62b, 62c, 62d are securably coupled to respective wing attach assemblies 58a, 58b, 58c, 58d by bolting or other suitable technique. Connecting assemblies 62a, 62b, 62c, 62d are also securably coupled to stow ring 52 by bolting or other suitable technique. In the illustrated embodiment, each connecting assembly 62a, 62b, 62c, 62d has two points of connection with stow ring 52. In addition, connecting assemblies 62a, 62d are selectively secured to fore-aft beam 54a of fuselage 12 and connecting assemblies 62b, 62c are selectively secured to fore-aft beam 54b of fuselage 12. More specifically, a plurality of clevises 64a, 64b, 64c, 64d are securably coupled to fore-aft beams 54a, 54b of fuselage 12 by bolting, welding or other suitable technique and each connecting assembly 62a, 62b, 62c, 62d includes an adaptor fitting 66a, 66b, 66c, 66d that is operable to sweep through clevises 64a, 64b, 64c, 64d as wing 18 is transitioned between the flight orientation and the stowed orientation. Each clevis 64a, 64b, 64c, 64d has a lock assembly associated therewith illustrated as actuated pins 68a, 68b, 68c, 68d. Actuated pins 68a, 68b, 68c, 68d extend through respective openings in clevises 64a, 64b, 64c, 64d and adaptor fittings 66a, 66b, 66c, 66d to secure connecting assemblies 62a, 62b, 62c, 62d to fore-aft beams 54a, 54b when the respective openings are aligned and wing 18 is in flight orientation.

In addition, each guide clevis 56a, 56b, 56c, 56d has a lock assembly associated therewith illustrated as actuated pins 70a, 70b, 70c, 70d. Actuated pins 70a, 70b, 70c, 70d extend through respective openings in guide clevises 56a, 56b, 56c, 56d and stow ring 52 when the respective openings are aligned and wing 18 is in flight orientation. Actuated pins 68a, 68b, 68c, 68d and actuated pins 70a, 70b, 70c, 70d are preferably fail safe actuated pins that are controlled by an onboard computing system operable to receive sensor data from and send commands to controllers associated with each of the actuated pins. Preferably, the onboard computing system is operable to individually and independently control and operate each of the actuated pins.

Figure 4:
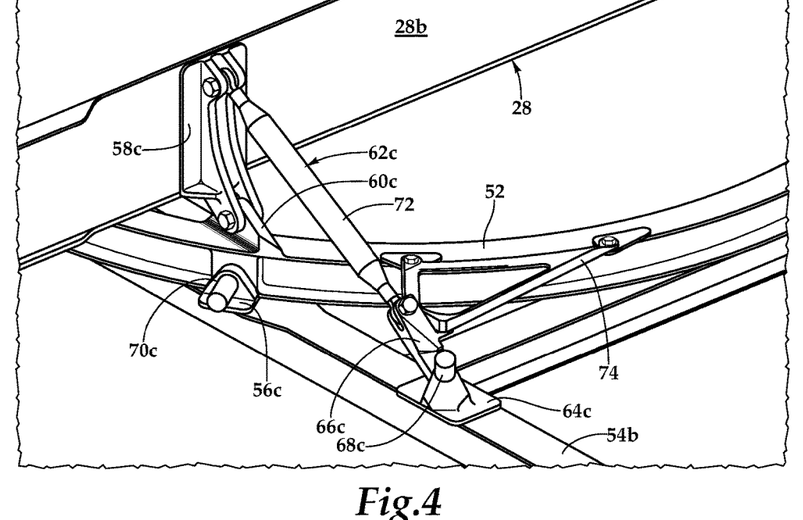
FIG. 4 is an enlarged view of a connecting assembly of a wing pivot apparatus for rotating a wing of a tiltrotor aircraft between a flight orientation and a stowed orientation in accordance with embodiments of the present disclosure.

Referring next to FIG. 4, an enlarged view of connecting assembly 62c is provided. It is noted that connecting assembly 62c is substantially similar to connecting assemblies 62a, 62b, 62d therefore, for sake of efficiency, certain features will be disclosed only with regard to connecting assembly 62c. One having ordinary skill in the art, however, will fully appreciate an understanding of connecting assemblies 62a, 62b, 62d based upon the disclosure herein of connecting assembly 62c. In the illustrated embodiment, connecting assembly 62c includes fore-aft link 72 that is securably coupled to wing attach assembly 58c by bolting or other suitable technique. In addition, fore-aft link 72 that is securably coupled to adaptor fitting 66c by bolting or other suitable technique. Connecting assembly 62c also includes an A-frame brace 74 that is securably coupled to and/or integral with adaptor fitting 66c. In addition, A-frame brace 74 is securably coupled to stow ring 52 at two locations by bolting or other suitable technique. Connecting assembly 62c is operable to react to flight loads when wing 18 is in the flight orientation. For example, fore-aft link 72 preferably forms an angle between about 30 degrees and about 60 degrees relative to fore-aft beam 54a of fuselage 12 and more preferably an angle between about 40 degrees and about 50 degrees relative to fore-aft beam 54a of fuselage 12.

Figure 2A:
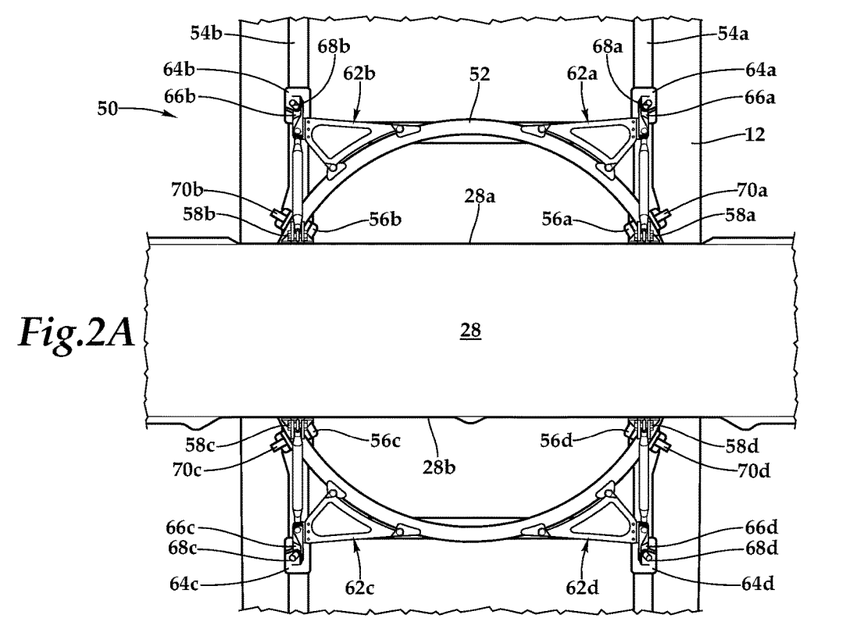
FIGS. 2A-2C are top views of a wing pivot apparatus rotating a wing of a tiltrotor aircraft between a flight orientation and a stowed orientation in accordance with embodiments of the present disclosure.
Figure 2B:
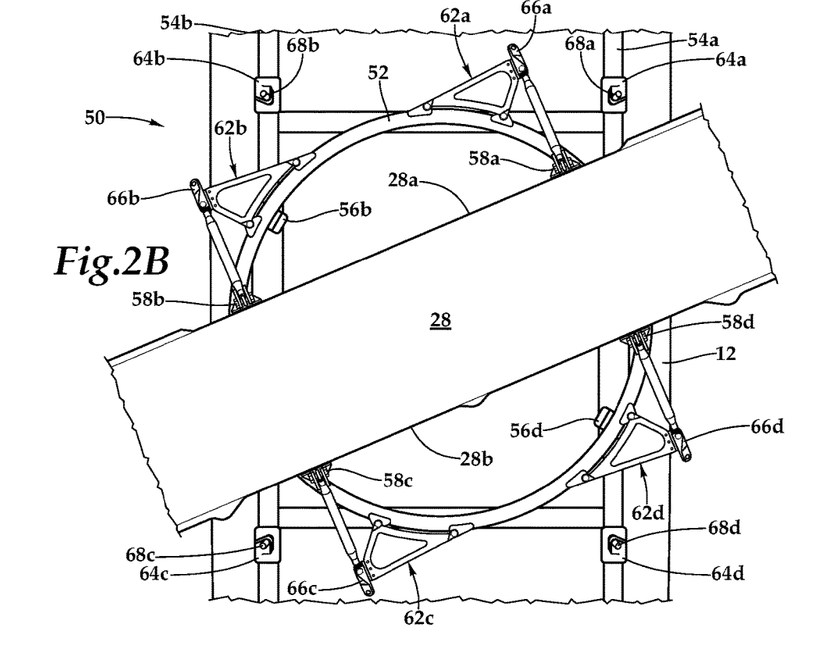
Figure 2C:
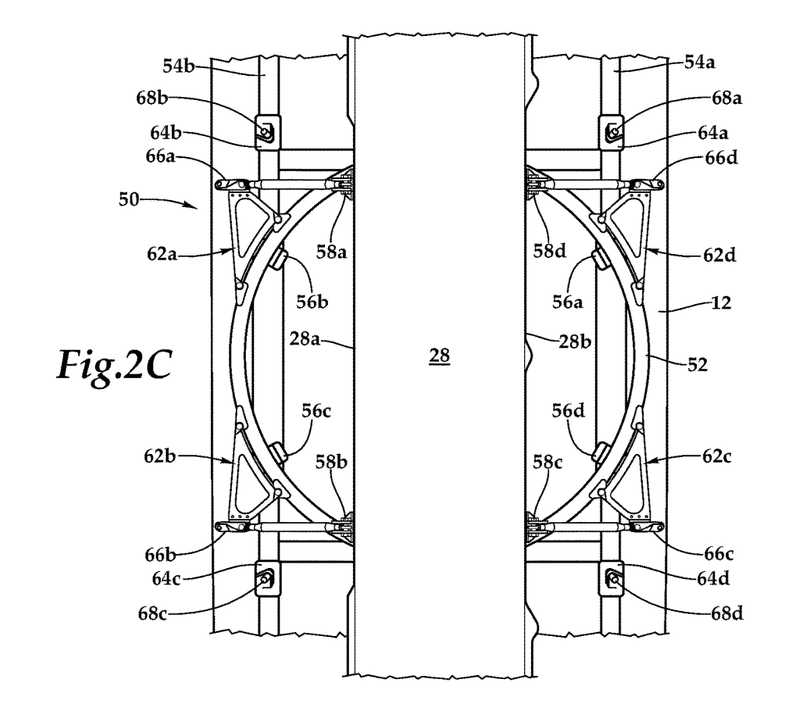
Figure 3A:
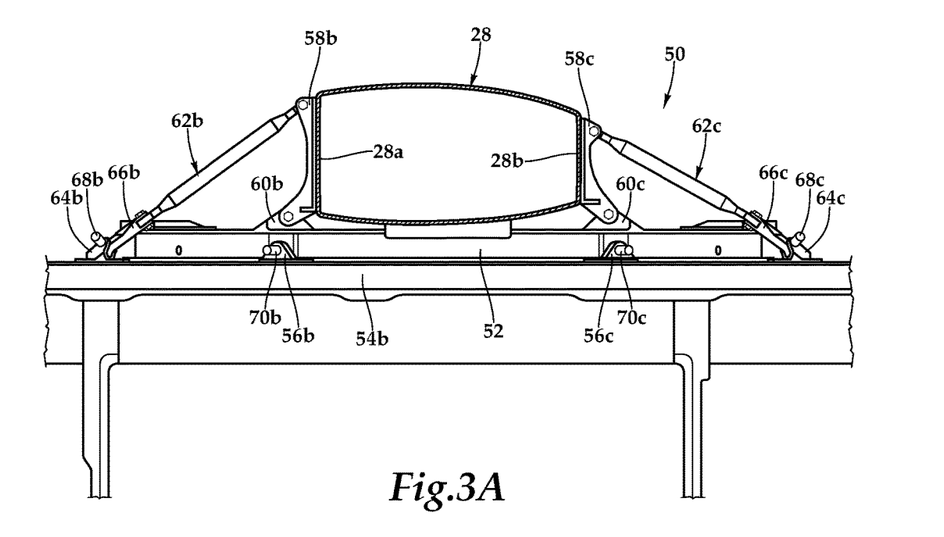
FIGS. 3A-3B are side and isometric views of a wing pivot apparatus for rotating a wing of a tiltrotor aircraft between a flight orientation and a stowed orientation in accordance with embodiments of the present disclosure.
Figure 3B:
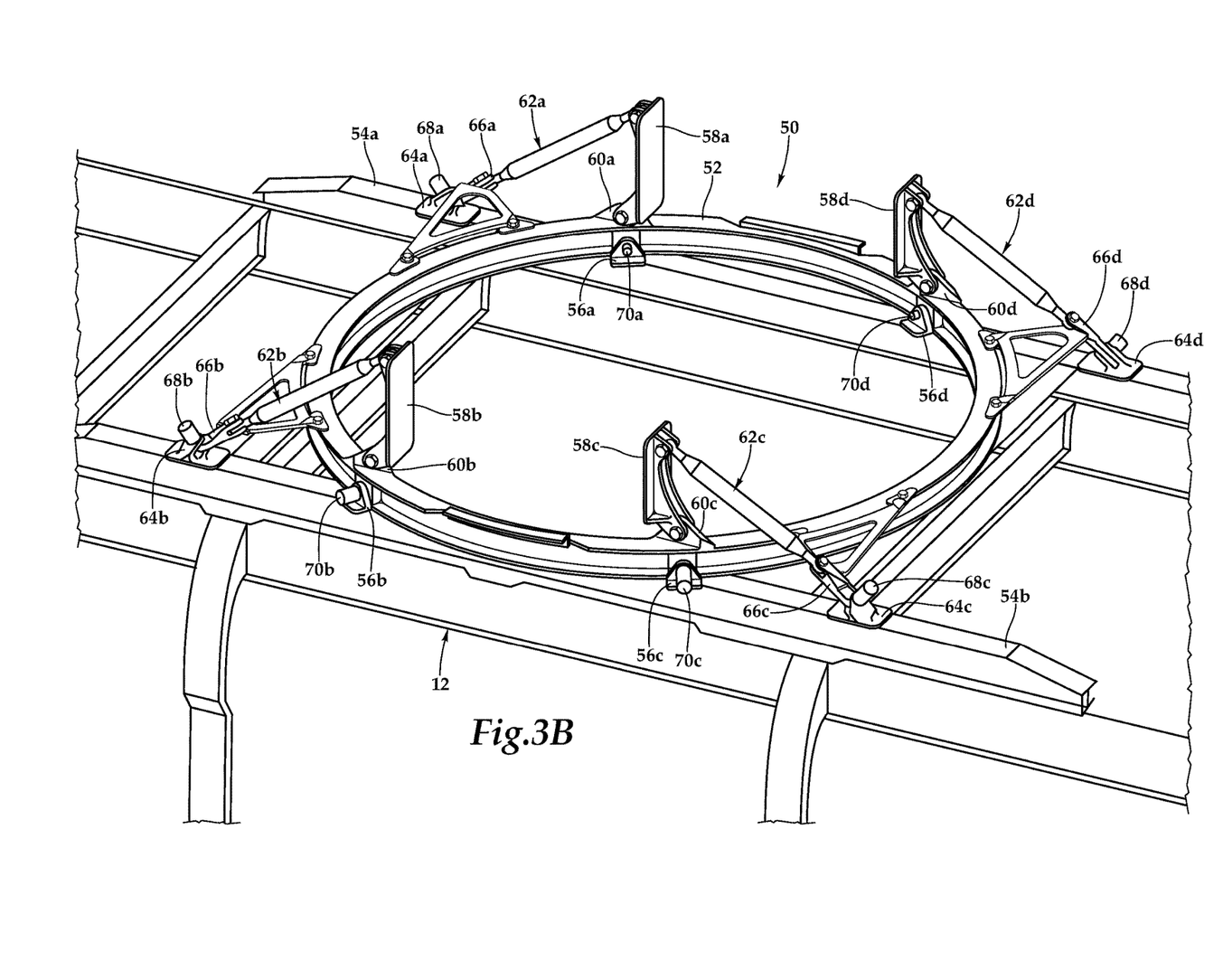
Figure 5A:
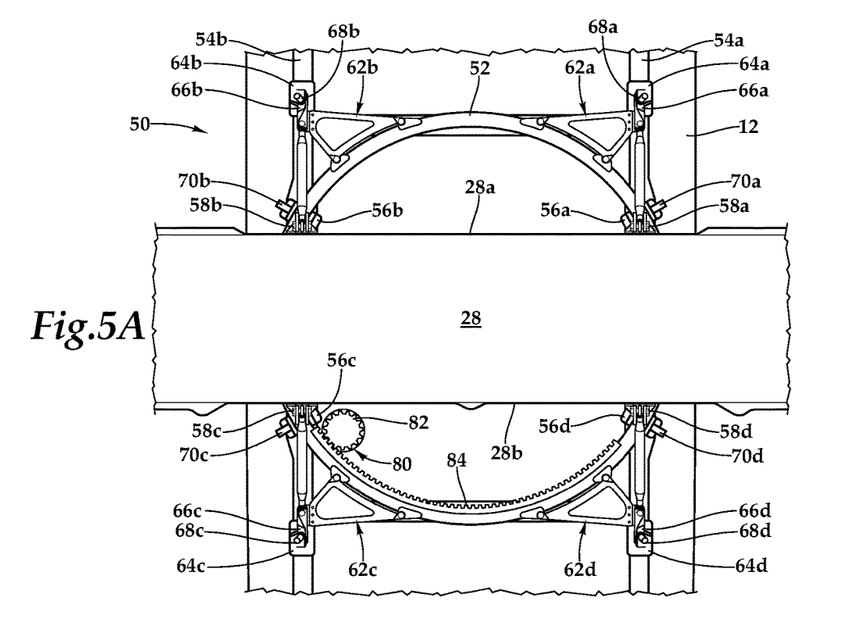
FIGS. 5A-5C are top views of a wing pivot apparatus for rotating a wing of a tiltrotor aircraft between a flight orientation and a stowed orientation including exemplary actuators in accordance with embodiments of the present disclosure.

As illustrated in the progression of FIGS. 2A-2C, wing attach assemblies 58a, 58b, 58c, 58d, connecting assemblies 62a, 62b, 62c, 62d and stow ring 52 rotate together with spar assembly 28 to reversibly rotate wing 18 between the flight orientation and the stowed orientation. To cause wing 18 to rotate between the flight orientation and the stowed orientation, one or more actuators may be used. It is noted that prior to transitioning wing 18 from the flight orientation to the stowed orientation, actuated pins 68a, 68b, 68c, 68d selectively securing adaptor fittings 66a, 66b, 66c, 66d within respective clevises 64a, 64b, 64c, 64d and actuated pins 70a, 70b, 70c, 70d selectively securing stow ring 52 to guide clevises 56a, 56b, 56c, 56d must be disengaged by withdrawing the pins from engagement with the respective openings. Thereafter, rotation of wing 18 from the flight orientation to the stowed orientation may commence. As best seen in FIG. 5A, a gear driven rotary actuator 80 includes a gear assembly 82 that is coupled to fuselage 12 and a rack assembly 84 that is coupled to stow ring 52. Preferably, rotation of gear assembly 82 is controlled by an onboard computing system operable to receive sensor data from and send commands to a controller associated with gear assembly 82 to enable gear assembly 82 to rotate in the desired direction at the desired speed to transition wing 18 between the flight orientation and the stowed orientation.

Figure 5B:
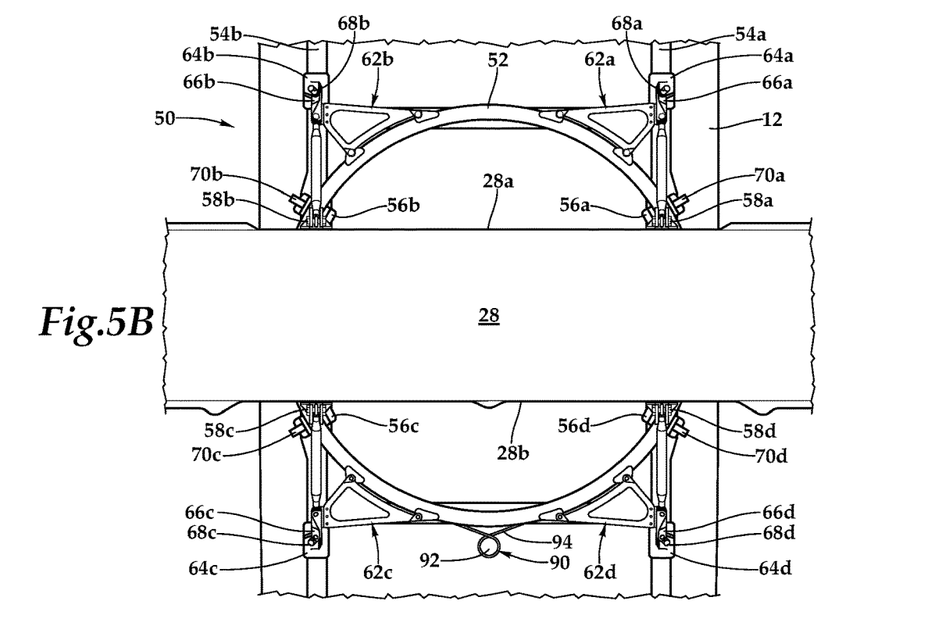
Figure 5C:
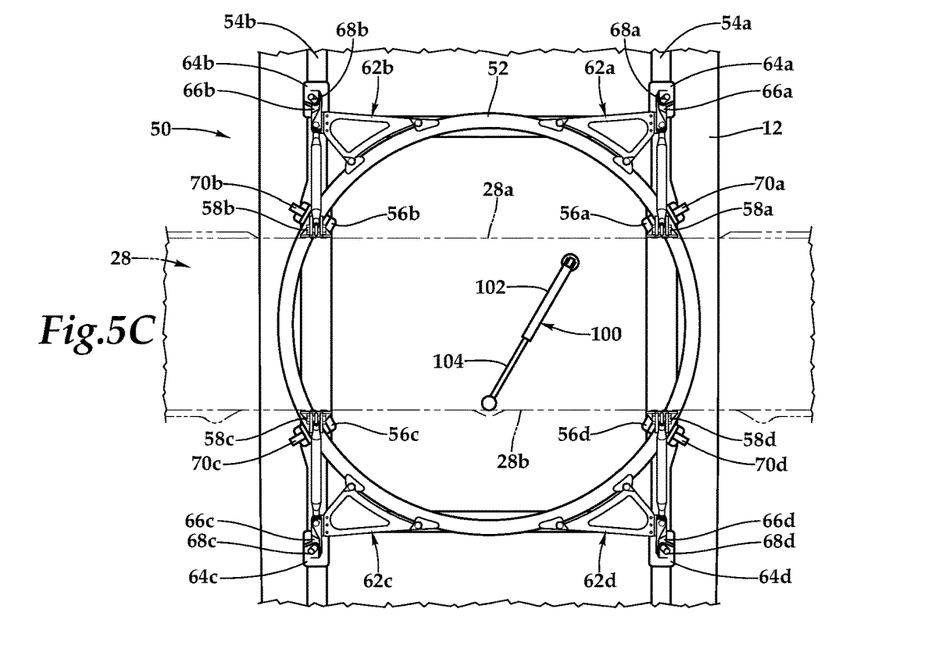

In another example, as best seen in FIG. 5B, a capstan rotary actuator 90 includes a drum assembly 92 that is coupled to fuselage 12 and a cable 94 wrapped around drum assembly 92 and stow ring 52 such that rotation of drum assembly 92 causes stow ring 52 to rotate. Preferably, rotation of drum assembly 92 is controlled by an onboard computing system operable to receive sensor data from and send commands to a controller associated with drum assembly 92 to enable drum assembly 92 to rotate in the desired direction at the desired speed to transition wing 18 between the flight orientation and the stowed orientation. In a further example, as best seen in FIG. 5C, a linear actuator 100 includes a cylinder assembly 102 that is coupled to fuselage 12 and a piston assembly 104 that is coupled to a lower surface of spar assembly 28. Preferably, extension and retraction of piston assembly 104 relative to cylinder assembly 102 is controlled by an onboard computing system operable to receive sensor data from and send commands to a controller associated with linear actuator 100 to enable extension and retraction of linear actuator 100 to transition wing 18 between the flight orientation and the stowed orientation.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A wing pivot apparatus for rotating a wing between a flight orientation and a stowed orientation relative to a fuselage of a tiltrotor aircraft, the wing having forward and aft spars and the fuselage having first and second fore-aft beams, the apparatus comprising:
   a stow ring rotatably mounted to the fuselage; first and second forward wing attach assemblies coupled to the forward spar of the wing and coupled to the stow ring;
   first and second aft wing attach assemblies coupled to the aft spar of the wing and coupled to the stow ring;
   first and second forward connecting assemblies coupled respectively between the first and second forward wing attach assemblies and the stow ring and selectively securable respectively to the first and second fore-aft beams of the fuselage at locations forward of the stow ring to react to flight loads from the wing to the first and second fore-aft beams at the locations forward of the stow ring;
   first and second aft connecting assemblies coupled respectively between the first and second aft wing attach assemblies and the stow ring and selectively securable respectively to the first and second fore-aft beams of the fuselage at locations aft of the stow ring to react to flight loads from the wing to the first and second fore-aft beams at the locations aft of the stow ring;
   a plurality of lock assemblies selectively securing the connecting assemblies to the fore-aft beams of the fuselage when the wing is in the flight orientation; and
   an actuator coupled to the fuselage operable to reversibly rotate the wing between the flight orientation and the stowed orientation.

2. The apparatus as recited in claim 1 further comprising a plurality of guide clevises securably coupled to the fore-aft beams of the fuselage operable to slidably receive the stow ring therein.

3. The apparatus as recited in claim 2 wherein the plurality of lock assemblies selectively secures the stow ring to the guide clevises when the wing is in the flight orientation.

4. The apparatus as recited in claim 1 wherein each of the forward connecting assemblies extends between an upper portion of a respective wing attach assembly and a respective fore-aft beam of the fuselage forward of the stow ring at an angle between 30-60 degrees relative to the respective fore-aft beam of the fuselage and wherein each of the aft connecting assemblies extends between an upper portion of a respective wing attach assembly and a respective fore-aft beam of the fuselage aft of the stow ring at an angle between 30-60 degrees relative to the respective fore-aft beam of the fuselage.

5. The apparatus as recited in claim 1 wherein each of the forward connecting assemblies extends between an upper portion of a respective wing attach assembly and a respective fore-aft beam of the fuselage forward of the stow ring at an angle between 40-50 degrees relative to the respective fore-aft beam of the fuselage and wherein each of the aft connecting assemblies extends between an upper portion of a respective wing attach assembly and a respective fore-aft beam of the fuselage aft of the stow ring at an angle between 40-50 degrees relative to the respective fore-aft beam of the fuselage.

6. The apparatus as recited in claim 1 further comprising a plurality of clevises securably coupled to the fore-aft beams of the fuselage and wherein, the connecting assemblies each include an adaptor fitting operable to sweep through the clevises such that the lock assemblies are operable to selectively secure the adaptor fittings to the fore-aft beams of the fuselage when the wing is in the flight orientation and such that the actuator is operable to reversibly rotate the wing between the flight orientation and the stowed orientation when the lock assemblies are disengaged.

7. The apparatus as recited in claim 1 wherein each of the connecting assemblies has two points of connection with the stow ring.

8. The apparatus as recited in claim 1 wherein each of the connecting assemblies further comprises an adaptor fitting selectively securable to a respective fore-aft beam of the fuselage, a fore-aft link extending between the adaptor fitting and a respective wing attach assembly, and a brace extending between the adaptor fitting and the stow ring.

9. The apparatus as recited in claim 1 wherein the lock assemblies further comprise actuated pins.

10. The apparatus as recited in claim 1 wherein the actuator further comprises a rotary actuator operably coupled between the fuselage and the stow ring.

11. The apparatus as recited in claim 10 wherein the rotary actuator further comprises a capstan actuator.

12. The apparatus as recited in claim 10 wherein the rotary actuator further comprises a gear driven actuator.

13. The apparatus as recited in claim 1 wherein the actuator further comprises a linear actuator operably coupled between the fuselage and the wing.

14. A tiltrotor aircraft having a VTOL flight mode, a forward flight mode and a storage mode, the aircraft comprising:
a fuselage;
a wing rotatably mounted to the fuselage, the wing reversibly rotatable between a flight orientation, substantially perpendicular to the fuselage, in the flight modes, and a stowed orientation, substantially parallel to the fuselage, in the storage mode;
a wing pivot apparatus disposed between the fuselage and the wing, the wing pivot apparatus including:
a stow ring rotatably mounted to the fuselage; first and second forward wing attach assemblies coupled to the forward spar of the wing and coupled to the stow ring; first and second aft wing attach assemblies coupled to the aft spar of the wing and coupled to the stow ring;
first and second forward connecting assemblies coupled respectively between the first and second forward wing attach assemblies and the stow ring and selectively securable respectively to the first and second fore-aft beams of the fuselage at locations forward of the stow ring to react to flight loads from the wing to the first and second fore-aft beams at the locations forward of the stow ring;
first and second aft connecting assemblies coupled respectively between the first and second aft wing attach assemblies and the stow ring and selectively securable respectively to the first and second fore-aft beams of the fuselage at locations aft of the stow ring to react to flight loads from the wing to the first and second fore-aft beams at the locations aft of the stow ring;
a plurality of lock assemblies selectively securing the connecting assemblies to the fore-aft beams of the fuselage when the wing is in the flight orientation; and
an actuator coupled to the fuselage operable to reversibly rotate the wing between the flight orientation and the stowed orientation.

15. The aircraft as recited in claim 14 further comprising a plurality of guide clevises securably coupled to the fore-aft beams of the fuselage operable to slidably receive the stow ring therein and wherein the plurality of lock assemblies selectively secures the stow ring to the guide clevises when the wing is in the flight orientation.

16. The aircraft as recited in claim 14 wherein each of the forward connecting assemblies extends between an upper portion of a respective wing attach assembly and a respective fore-aft beam of the fuselage forward of the stow ring at an angle between 30-60 degrees relative to the respective fore-aft beam of the fuselage and wherein each of the aft connecting assemblies extends between an upper portion of a respective wing attach assembly and a respective fore-aft beam of the fuselage aft of the stow ring at an angle between 30-60 degrees relative to the respective fore-aft beam of the fuselage.

17. The aircraft as recited in claim 14 wherein each of the forward connecting assemblies extends between an upper portion of a respective wing attach assembly and a respective fore-aft beam of the fuselage forward of the stow ring at an angle between 40-50 degrees relative to the respective fore-aft beam of the fuselage and wherein each of the aft connecting assemblies extends between an upper portion of a respective wing attach assembly and a respective fore-aft beam of the fuselage aft of the stow ring at an angle between 40-50 degrees relative to the respective fore-aft beam of the fuselage.

18. The aircraft as recited in claim 14 further comprising a plurality of clevises securably coupled to the fore-aft beams of the fuselage and wherein, the connecting assemblies each include an adaptor fitting operable to sweep through the clevises such that the lock assemblies are operable to selectively secure the adaptor fittings to the fore-aft beams of the fuselage when the wing is in the flight orientation and such that the actuator is operable to reversibly rotate the wing between the flight orientation and the stowed orientation when the lock assemblies are disengaged.

19. The aircraft as recited in claim 14 wherein the lock assemblies further comprise actuated pins.

20. The aircraft as recited in claim 14 wherein the actuator is selected from the group consisting of a rotary actuator, a capstan actuator, a gear driven actuator and a linear actuator.

* * * * *